(12) United States Patent
Small et al.

(10) Patent No.: US 11,451,564 B1
(45) Date of Patent: Sep. 20, 2022

(54) SYSTEMS AND METHODS FOR THREAT DISRUPTION

(71) Applicant: ZeroFOX, Inc., Baltimore, MD (US)

(72) Inventors: Samuel Kevin Small, Baltimore, MD (US); Michael Morgan Price, Baltimore, MD (US); Jason Emile Sumpter, Abingdon, MD (US); James Christopher Foster, Baltimore, MD (US)

(73) Assignee: ZeroFOX, Inc., Baltimore, MD (US)

( * ) Notice: Subject to any disclaimer, the term of this patent is extended or adjusted under 35 U.S.C. 154(b) by 0 days.

(21) Appl. No.: 17/480,316

(22) Filed: Sep. 21, 2021

(51) Int. Cl.
*H04L 9/40* (2022.01)

(52) U.S. Cl.
CPC .............................. *H04L 63/1416* (2013.01)

(58) Field of Classification Search
None
See application file for complete search history.

(56) References Cited

U.S. PATENT DOCUMENTS

| | | | |
|---|---|---|---|
| 8,495,709 B1* | 7/2013 | Cooper | H04L 43/14 713/153 |
| 9,537,886 B1* | 1/2017 | Gareau | H04L 63/1441 |
| 10,891,371 B2* | 1/2021 | Chari | G06F 21/552 |
| 2011/0239300 A1* | 9/2011 | Klein | G06F 21/565 726/23 |
| 2013/0031599 A1* | 1/2013 | Luna | G06F 3/0653 726/1 |
| 2017/0286671 A1* | 10/2017 | Chari | G06F 21/552 |
| 2021/0075790 A1* | 3/2021 | Hebert | H04L 63/1491 |
| 2021/0250369 A1* | 8/2021 | Åvist | H04L 63/1408 |

* cited by examiner

*Primary Examiner* — Joseph P Hirl
*Assistant Examiner* — Hassan Saadoun
(74) *Attorney, Agent, or Firm* — DLA Piper LLP (US)

(57) ABSTRACT

A method for disrupting a detected cyberthreat can include receiving a request, the request identifying suspected malicious content; identifying one or more indicators of compromise (IOCs) associated with the content; enriching the request with the IOCs; verifying the request; and reporting the verified request and the one or more IOCs to a disruption network.

18 Claims, 8 Drawing Sheets

SYSTEMS AND METHODS FOR THREAT DISRUPTION

BACKGROUND OF THE DISCLOSURE

Traditionally in information technology (IT) and cybersecurity systems, many solutions function by securing the perimeter, and thus the internals, of a protected network. For example, it is common for systems to utilize firewalls, antivirus software, vulnerability assessment tools, and the like. The premise and motivation behind such a system is to prevent external threats from entering a protected network (e.g., a company, school, or other organization) and monitoring/assessing threat levels within the protected network. In addition, these systems can often include tools that scan the Internet outside of the protected network to detect threats to the organization. For example, there are tools that discover impersonating social media profiles, phishing sites, etc. and coordinate with social networks to get these removed, thus indirectly protecting the organization's network.

SUMMARY OF THE DISCLOSURE

According to one aspect of the present disclosure, a method for disrupting a detected cyberthreat can include receiving a request, the request identifying suspected malicious content; identifying one or more indicators of compromise (IOCs) associated with the content; enriching the request with the IOCs; transmitting the request and the one or more IOCs to an analyst device; receiving a verification indication from the analyst device; and reporting the verified request and the one or more IOCs to a disruption network.

In some embodiments, the disruption network can include a plurality of Internet providers and at least one of a domain registrar, a hosting platform, a domain name system (DNS) provider, an email security service, a content delivery network (CDN), or a deny list. In some embodiments, identifying the one or more IOCs can include identifying at least one of a social media account, a username of the social media account, an account ID of the social media account, a URL, a phishing kit, an author of the phishing kit, source code associated with the phishing kit, and one or more images.

In some embodiments, enriching the request can include identifying at least one of a social network associated with the content, a geo-location associated with the content, a host associated with the content, a registrar associated with the content, an Internet Assigned Numbers Authority (IANA) ID associated with the content, an IP address associated with the content, an autonomous system number associated with the content, or a link shortener associated with the content. In some embodiments, reporting the verified request and the one or more IOCs to the disruption network can include providing access to one or more members of the disruption network to pull the request and the one or more IOCs via an application programming interface (API).

In some embodiments, reporting the verified request and the one or more IOCs to the disruption network can include transmitting a first report to the disruption network, the first report comprising the verified request and the one or more IOCs; obtaining one or more additional IOCs in a subsequent 24-hour time period; and transmitting a second report to the disruption network, the second report comprising the verified request, the one or more IOCs, and the one or more additional IOCs. In some embodiments, the method can further include performing a live scan of the content to determine whether the content is active.

In some embodiments, performing a live scan can include at least one of scanning a webpage associated with the content to identify a change of a removal of the content; scanning a webpage or a service for a service response; or monitoring an extensive provisional protocol (EPP) status of a domain associated with the content. In some embodiments, the method can further include capturing feedback associated with the report to the disruption network. Capturing can include at least one of determining, via a browser driver, if any of the one or more IOCs is indicated as being malicious; determining, via querying a DNS server, if any of the one or more IOCs is blocked; or determining, via an email security provider, if any of the one or more IOCs is indicated as being malicious.

According to another aspect of the present disclosure, a non-transitory computer-readable medium has instructions stored thereon for execution by a server to implement a method for generating an attack surface for a protected entity. The method can include the steps of receiving a request, the request identifying suspected malicious content; identifying one or more indicators of compromise (IOCs) associated with the content; enriching the request with the IOCs; transmitting the request and the one or more IOCs to an analyst device; receiving a verification indication from the analyst device; and reporting the verified request and the one or more IOCs to a third-party.

In some embodiments, reporting the verified request and the one or more IOCs to the third-party can include identifying an entity associated with the request; identifying a format associated with the entity; transforming the one or more IOCs based on the format; and transmitting the transformed one or more IOCs and the request to the entity. In some embodiments, verifying the request can include transmitting the request and the one or more IOCs to an analyst device; and receiving a verification indication from the analyst device.

In some embodiments, identifying the one or more IOCs can include identifying at least one of a social media account, a username of the social media account, an account ID of the social media account, a URL, a phishing kit, an author of the phishing kit, source code associated with the phishing kit, and one or more images. In some embodiments, enriching the request can include identifying at least one of a social network associated with the content, a geo-location associated with the content, a host associated with the content, a registrar associated with the content, an Internet Assigned Numbers Authority (IANA) ID associated with the content, an IP address associated with the content, an autonomous system number associated with the content, or a link shortener associated with the content.

In some embodiments, the method can further include performing a live scan of the content to determine whether the content is active. In some embodiments, performing a live scan can include at least one of scanning a webpage associated with the content to identify a change of a removal of the content; scanning a webpage or a service for a service response; or monitoring an extensive provisional protocol (EPP) status of a domain associated with the content. In some embodiments, the method can further include capturing feedback associated with the reporting. The capturing can include at least one of determining, via a browser driver, if any of the one or more IOCs is indicated as being malicious; determining, via querying a DNS server, if any of the one or more IOCs is blocked; or determining, via an email security provider, if any of the one or more IOCs is indicated as being malicious.

According to another aspect of the present disclosure, a system for disrupting a detected cyberthreat can include a server configured to receive a request, the request identifying suspected malicious content; identify one or more indicators of compromise (IOCs) associated with the content; enrich the request with the IOCs; verify the request; and report the verified request and the one or more IOCs to a third-party. In some embodiments, reporting the verified request and the one or more IOCs to the third-party can include identifying an entity associated with the request; identifying a format associated with the entity; transforming the one or more IOCs based on the format; and transmitting the transformed one or more IOCs and the request to the entity. In some embodiments, the server can be further configured to capture feedback associated with the reporting. The capturing can include at least one of determining, via a browser driver, if any of the one or more IOCs is indicated as being malicious; determining, via querying a DNS server, if any of the one or more IOCs is blocked; or determining, via an email security provider, if any of the one or more IOCs is indicated as being malicious.

DESCRIPTION

The following detailed description is merely exemplary in nature and is not intended to limit the invention or the applications of its use.

As discussed above, the standard theme behind IT and cybersecurity solutions is to protect the internals of an entity or organization. To the extent the solutions explore outside the protected network, systems are typically limited to detecting threats on social media networks and potentially submitting requests for takedown. However, more can be done to deal with detected threats preemptively and robustly.

Applications, websites, and network services are often deployed, made available, and made discoverable through the composition and combination of multiple layers of Internet services and technology. When a cyberthreat or other entity/actor with malicious intent appears or is hosted somewhere on the internet, a third party may want it to have it removed (e.g., due to legal rights, contract violations, accusations of defamation, etc.). Third parties may submit a request to the service provider hosting the application, service, or content in question, but the provider may choose not to respond, nor agree with the removal reason provided, nor react in a timely fashion, among others. Instead, the disclosed embodiments can simultaneously appeal to all component service providers and, if successful, essentially remove a necessary or meaningfully significant piece of the malicious actor's composition, thereby rendering the application, service, or content host unable to display or service said content. Alternatively, while these efforts may not effectively remove the content from its host, such actions can make the content more difficult to discover, find, or share by way of successfully appealing to search engine providers, reputation services (used elsewhere by application, network, and application service providers on the internet), or Internet blacklists. When thoroughly and successfully carried out, these efforts effectively dismantle the infrastructure used by the malicious actor and can henceforth place such a burden on the actor such that attempting to re-home, re-post, or recover and continue to pursue their efforts is now significantly more expensive by way of time, money, and effort. In other words, the threat has been "disrupted." Hence, through the aforementioned dismantling efforts, third-parties may more regularly, consistently, and meaningfully disrupting and thwart or disrupt whatever campaign or efforts the actor originally launched or intended to maintain.

Thus, embodiments of the present disclosure relate to systems and methods for disrupting threats. The threats can be detected in any standard fashion or by any system that is well-known in the art. The disclosed principles offer more "ambition" in terms of dealing with detected cyberthreats. The systems and methods described herein can degrade and disrupt an attacker's infrastructure beyond merely taking down a profile (or website, application, etc.). Embodiments of the present disclosure can harvest details of a threat and transmit them to a network of entities, which can herein be referred to as a global disruption network (GDN). The disclosed GDN can include a multitude of classes of Internet providers to block where the threat is located, domain registrars, hosting platforms, domain name system (DNS) providers (up to twenty categories), etc. From here, one or more (or even all) of the members of the GDN can take action on the entity associated with the threat, which can lead to a plurality of blockings of the threat. Thus, the disclosed principles can disrupt a cyberthreat's ability to operate on the Internet as a whole. In addition, the systems and methods of the present disclosure can include an API endpoint that is specifically configured to be compatible with the schemas of various providers. In particular, the disclosed system and transform/configure a threat and its associated information into the proper format to coordinate with specific providers, thus simplifying the communication process.

Figure 1:
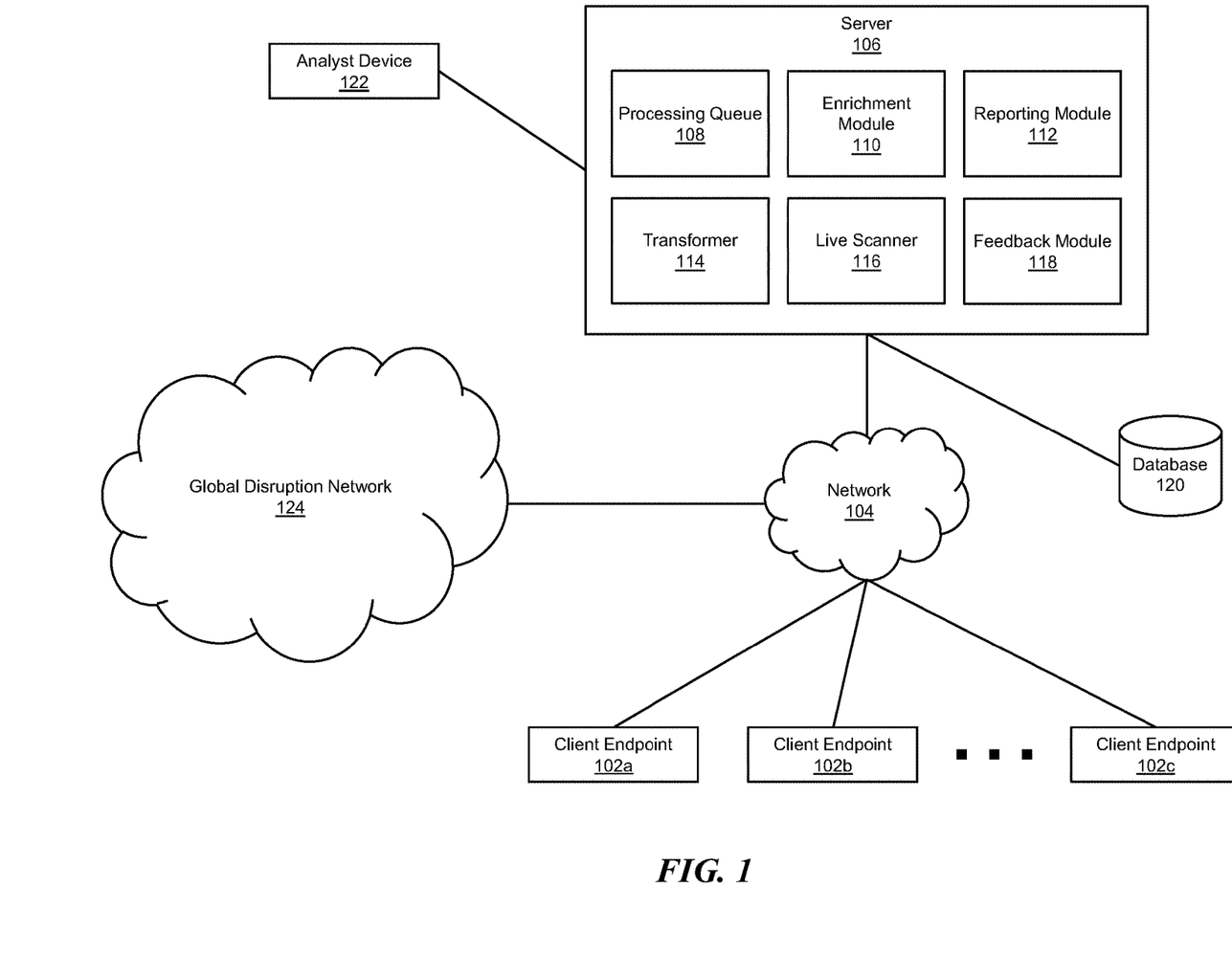
FIG. 1 is a block diagram of an example system for threat disruption according to some embodiments of the present disclosure.

FIG. 1 is a block diagram of an example system 100 for threat disruption according to some embodiments of the present disclosure. The system 100 can include a plurality of client endpoints 102*a-n* (generally referred to herein as a "client endpoint 102" or collectively referred to herein as "client endpoints 102") and a server 106, which are communicably coupled via a network 104. In some embodiments, the system 100 can include any number of client endpoints. For example, a plurality of entities may subscribe to protection services from a company, and the server 106 may perform said protection services to protect the client endpoints 102. In addition, the server 106 is communicably coupled to a database 120 and an analyst device 122. In some embodiments, the analyst device 122 can be a device similar to or the same as client endpoints 102. Additionally, the analyst device 122, client endpoints 102, and the server 106 are communicably coupled to a global disruption network 124. As discussed above, the global disruption network 124 can include a multitude of classes of Internet providers to block where the threat is located, domain registrars, hosting platforms, domain name system (DNS) providers (up to twenty categories), etc.

A client endpoint 102 or analyst device 122 can include one or more computing devices capable of receiving user input, transmitting and/or receiving data via the network 104, and or communicating with the server 106. In some embodiments, a client endpoint 102 or analyst device 122 can be a conventional computer system, such as a desktop or laptop computer. Alternatively, a client endpoint 102 or analyst device 122 can be a device having computer functionality, such as a personal digital assistant (PDA), a mobile telephone, a smartphone, or other suitable device. In some embodiments, a client endpoint 102 or analyst device 122 can be the same as or similar to the computing device 800 described below with respect to FIG. 8. In some embodiments, the system 100 can include any number of client endpoints 102 or analyst devices 122.

The network 104 can include one or more wide areas networks (WANs), metropolitan area networks (MANs), local area networks (LANs), personal area networks (PANs), or any combination of these networks. The network 104 can include a combination of one or more types of networks, such as Internet, intranet, Ethernet, twisted-pair, coaxial cable, fiber optic, cellular, satellite, IEEE 801.11, terrestrial, and/or other types of wired or wireless networks. The network 104 can also use standard communication technologies and/or protocols.

The server 106 may include any combination of one or more of web servers, mainframe computers, general-purpose computers, personal computers, or other types of computing devices. The server 106 may represent distributed servers that are remotely located and communicate over a communications network, or over a dedicated network such as a local area network (LAN). The server 106 may also include one or more back-end servers for carrying out one or more aspects of the present disclosure. In some embodiments, the server 106 may be the same as or similar to server 700 described below in the context of FIG. 7.

As shown in FIG. 1, the server 106 includes a processing queue 108, an enrichment module 110, a reporting module 112, a transformer 114, a live scanner 116, and a feedback module 118. The server 106 is configured to receive a content takedown request for a piece of content, information, social media account, social media post, website/URL, domain, etc. The request can be received automatically from tools used to detect cyberthreats or other potentially malicious events (e.g., via live scanner 116) or can be received directly from a client endpoint 102. For example, a client endpoint 102 may itself run a tool that detects external malicious events, or it may allow a user (i.e., customer) on a client endpoint 102 to manually submit a request to takedown an event. When users submit takedown requests, it can be either via a customer platform running on the client endpoint 102 and/or via a specific API. The processing queue 108 accepts the received takedown requests and places them into a queue for processing.

The enrichment module 110 is configured to receive the takedown request and the relevant content from the processing queue 108. Once that has been received, the enrichment module 110 correlates the content with various indicators of compromise (IOCs). Popular realizations of IOCs can be cryptographic hashes, YARA signatures, etc., although IOCs are not limited to these. IOCs can be important because analysts (e.g., via analyst device 122) and users (e.g., via client endpoint 102) can leverage these correlated IOCs to disrupt the entire kill-chain associated with a collection of findings related to the original takedown request, as well as new ones.

The reporting module 112 is configured to generate and transmit reports for the takedown requests. For example, the reporting module 112 can send reports to the provider of the content via email, in a platform, or via API access. The reporting module 112 can also report to the infrastructure and services that are being directly used by the threat actor for malicious intent. Additional details with respect to reporting are described in relation to FIGS. 3-5.

The transformer 114 is configured to transform the IOCs detected by the enrichment module 110 to match pre-defined metrics or formats on behalf of a customer or provider. For example, the transformer 114 can transform the IOCs to match a particular JSON request body, which would then be pushed to a client endpoint 102 or a provider via the global disruption network 124.

The live scanner 116 is configured to scan findings to determine if the findings are still live or active and if they contain malicious content. Findings can include social media accounts and scanning a social media account can include determining whether the account has active or has been deactivated. In another example, a finding can be a phishing site and scanning the phishing site can include determining if the site continues to host content. The findings here are often related to the original content that was requested for takedown.

The feedback module 118 is configured to measure the impact of distributing the reports (e.g., takedown requests, content, and IOCs) to the global disruption network 124 and can monitor the effectiveness of the system. The feedback module 118 is operatively connected to the global disruption network 124, receiving effectiveness information or "feedback", effectively forming a feedback loop. In one example, the feedback module 118 can send an identified URL to Google Safe Browsing (or any other blacklist service) and, using a Web Chrome® driver (or any other browser driver or application capable of leveraging Google Safe Browsing services and data), can navigate to the page to see if Google Safe Browsing shows a message indicating that the page is malicious. In another example, the feedback module 118 can send an IP address or URL to DNS providers and query (or use a service to query) a DNS server for a response to see if the URL is blocked. In another example, the feedback module 118 can send content, such as a malicious URL, to an email security provider and then send an email containing the malicious URL to an internal email address to leverage the security provider and monitor its response.

Figure 2:
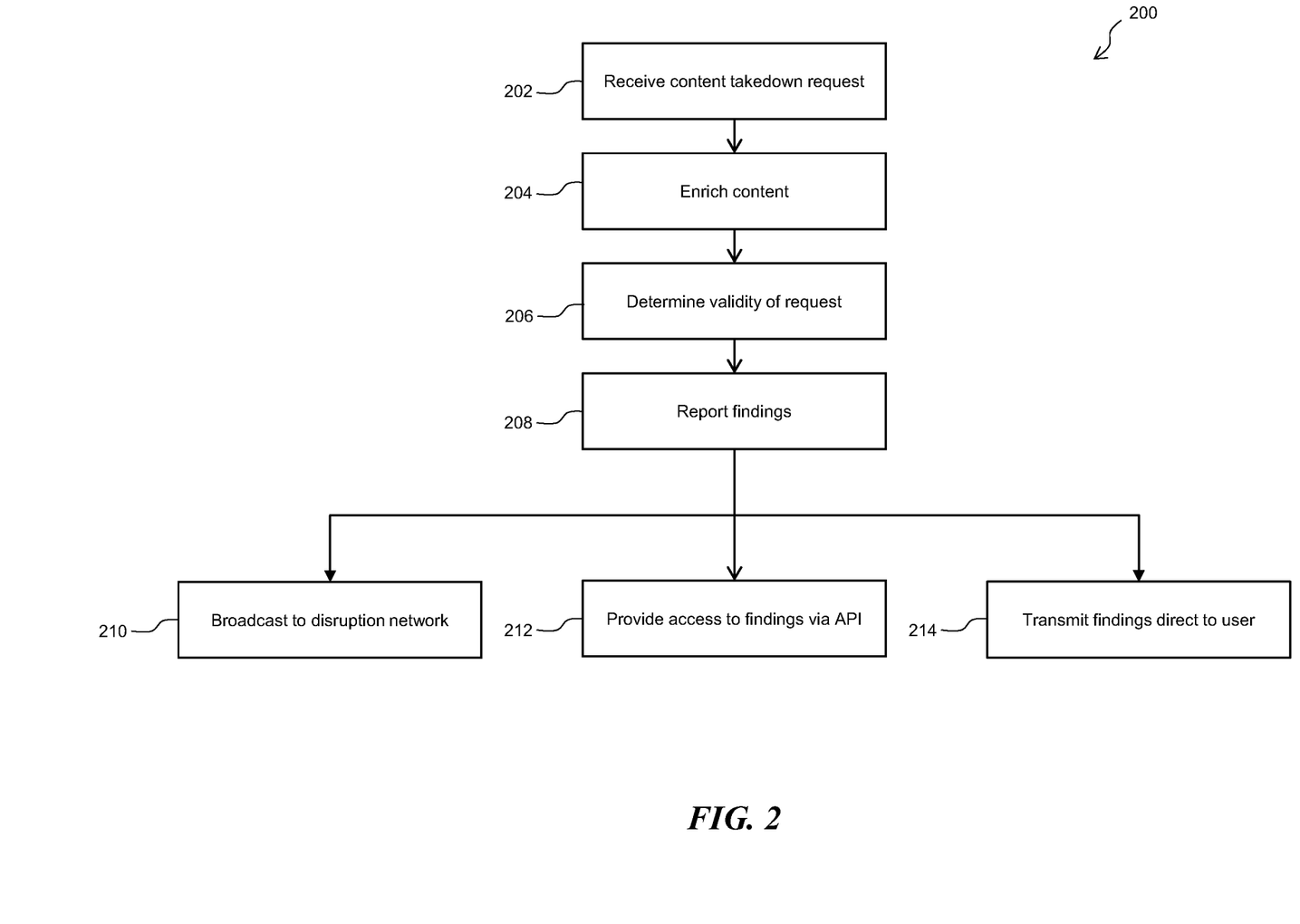
FIG. 2 shows an example process for disrupting a threat according to some embodiments of the present disclosure.

FIG. 2 shows an example process 200 for disrupting a threat according to some embodiments of the present disclosure. In some embodiments, process 200 can be performed by server 106 and its various modules. At block 202, server 106 receives a content takedown request. In some embodiments, the content takedown request can be received from a client endpoint 102, such as via API or a security platform running on the endpoint. In other embodiments, the content takedown request can be received automatically from a scanner on behalf of server 106, such as live scanner 116. In some embodiments, the content takedown request can be placed in the processing queue 108, where the request is then managed at some later point.

At block 204, the enrichment module 110 receives the takedown request and the relevant content and enriches the content. In the case that the request was handled by the processing queue 108, then the enrichment module 110 would receive the request from the processing queue 108. In some embodiments, enriching the content can include correlating the content with various IOCs, which can be leveraged to disrupt the entire kill-chain associated with the content. For example, in the case that a social media post was discovered and alerted by the disclosed platform (i.e., and a takedown request was submitted) because it contains malicious language, the enrichment module 110 can expand the shortened link to show the actual URL, which is then determined to host a phishing site that infringes on a trademark for an entity that subscribes to the protection service (i.e., is associated with a client endpoint 102). In this example, the IOCs identified by the enrichment module 110 can include: (1) the social media account who posted the content (aka the perpetrator), which includes the username and an account ID; (2) the phishing URL that was included in the perpetrator's post; (3) any phishing kits that are detected in the phishing page source, which include the author of the phishing kit and any source code left behind on the phishing kit; and (4) images included with the post.

Additionally, to continue the above example where IOCs (1)-(4) are identified, the enrichment module 110 can correlate/identify (1) the social media network used to post the malicious link; (2) the geo-location data included with the post; (3) the host, registrar, Whois, Internet Assigned Numbers Authority (IANA) ID, autonomous system number (ASN), IP address, and any other domain specific information; and (4) the link shortener used to mask the phishing URL (e.g., tinyURL). Note, the above IOCs and enrichments are merely exemplary in nature and the disclosed systems are not limited to such examples.

At block 206, the server 106 determines the validity of the takedown request. In some embodiments, determining the validity of the takedown request can include a manual verification process. For example, the server 106 can transmit the takedown request, associated content, IOCs, and enrichment to the analyst device 122, where an analyst can review the takedown request and correlated findings to determine if it is a valid request. Determining the validity of the takedown request, whether manual or automatic, can include determining if the finding actually includes malicious content, if the malicious content is relevant to the user/customer, whether there is sufficient evidence to prove malicious intent, and whether the identified account is leveraging a platform for malicious purposes in violation of terms of service. In the case that the request is sent to the analyst device 122 for analysis, the server 106 then receives a transmitted indication from the analyst device 122 (e.g., on behalf of an analyst) that the validity of the request has been verified.

At block 208, after determining that the findings and the takedown request are worth external reporting, the reporting module 112 transmits reports to the provider of the content. This transmission can be either by email, via the disclosed platform, or through an API. Other takedown actions can include reporting to the infrastructure and services that are being directly used by the threat actor/perpetrator for malicious intent. Additionally or alternatively, the reporting module 112 reports the findings to the global disruption network 124. These reports have the goal of disrupting the threat actors on the Internet and reducing the risk of increasing total victims. The reporting module 112, by transmitting the findings to the global disruption network, which includes various providers such as email security, DNS, content delivery networks (CDNs), and deny lists or other blacklists, allows the disclosed system to broadcast information to these providers, increasing the ability to stop attackers from being successful.

Reporting the findings at block 208 can include one or more of blocks 210-214. At block 210, the reporting module 112 broadcasts to the global disruption network 124, as discussed above. Additional details with respect to block 210 are discussed in FIG. 3. At block 212, the reporting module 112 provides access to the findings (IOCs, correlations, content, and takedown request) via an API interface. Additional details with respect to block 212 are discussed in FIG. 4. At block 214, the reporting module 112 transmits findings directly to a user at an endpoint device 102. Additional details with respect to block 214 are discussed in FIG. 5.

In some embodiments, after process 200 has been completed and a takedown request and respective report has been broadcast and reported, the live scanner 116 can scan related findings to determine if they are still live and/or active and contain malicious content. For example, the live scanner 116 can scan an identified social media account and determine if it has been deactivated. In another example, the live scanner 116 can scan an identified phishing site to determine if it continues to host content. In some embodiments, the live scanner 116 may scan continuously. Other techniques can include (1) scanning a webpage source for a change and/or removal of content; (2) scanning a webpage or service for a service response (e.g., an HTTP response); and (3) monitoring the extensive provisioning protocol (EPP) status of a domain.

Figure 3:
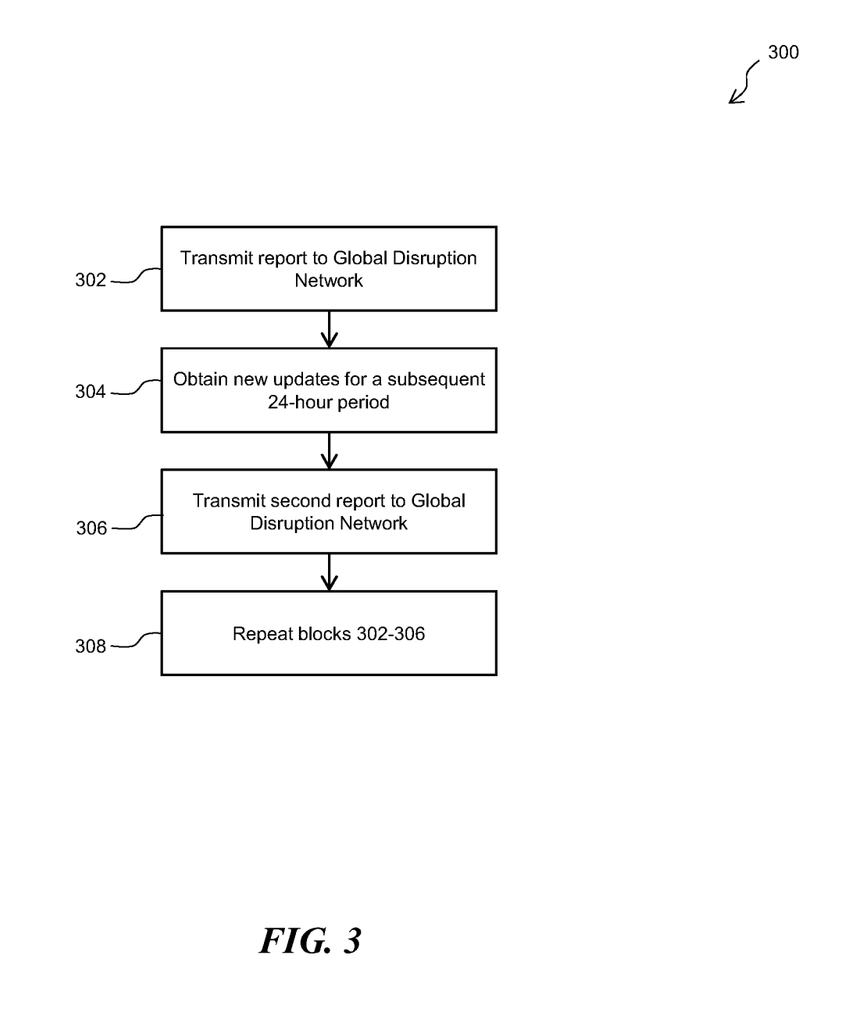
FIG. 3 is another example process for disrupting threats according to some embodiments of the present disclosure.

FIG. 3 is another example process 300 for disrupting threats according to some embodiments of the present disclosure. In some embodiments, process 300 can be a method of broadcasting and can be performed by the reporting module 112 at block 210 of process 200. At block 302, the reporting module 112 transmits a report and findings to the global disruption network 124. The report can be in an email format. At block 304, the reporting module 112 obtains newly updated IOCs for the associated takedown request for a subsequent 24-hour period of time. At block 306, the reporting module 112 transmit a second report to the global disruption network 124, which includes the newly updated IOCs obtained at block 304. At block 308, the reporting module 112 repeats blocks 302-306. In other words, the reporting module 112 can repetitively transmit a daily email to the global disruption network 124 with all newly updated IOCs from the previous 24-hour period.

Figure 4:
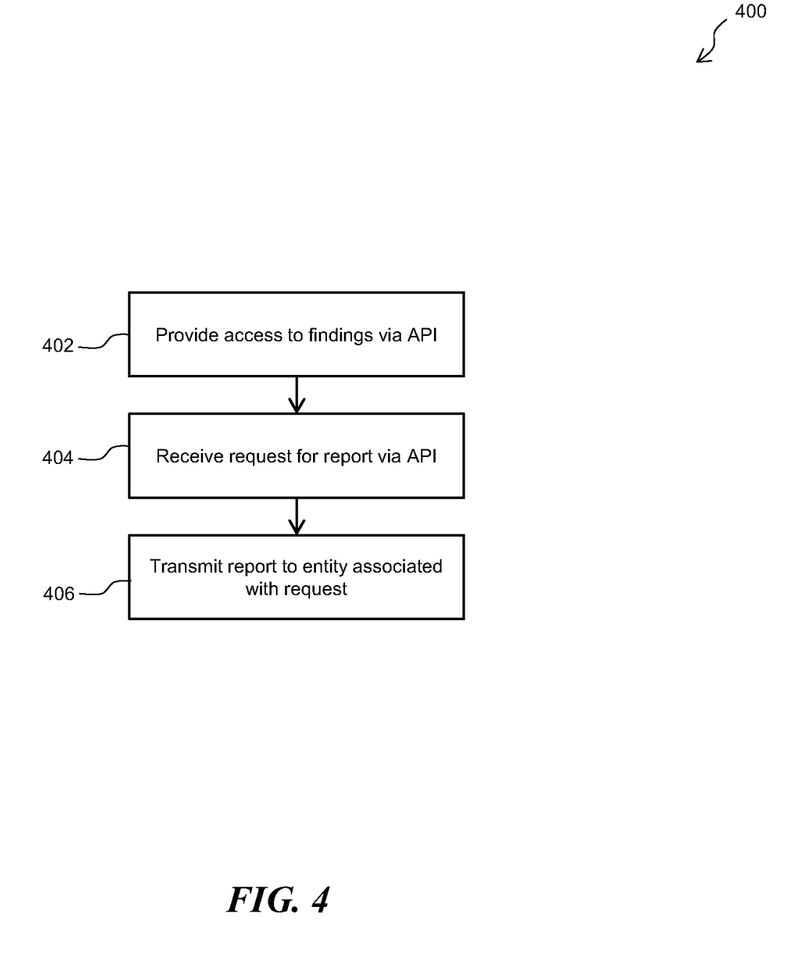
FIG. 4 is another example process for disrupting threats according to some embodiments of the present disclosure.

FIG. 4 is another example process 400 for disrupting threats according to some embodiments of the present disclosure. In some embodiments, process 400 can be a method of broadcasting directly to partners and can be performed by the reporting module 112 at block 212 of process 200. At block 402, the reporting module 112 provides access to findings via an API to one or more partners that are members of the GDN. Those members can be queried or perform a network request, such as an HTTP GET request, to pull in the same types of data that is pushed out of the system. At block 404, the reporting module 112 receives a request to pull a report via the API. At block 406, the reporting module 112 transmits the report to the entity associated with the request via the API. In some embodiments, the findings transmitted via pulling from the API may be IOCs, such as URLs associated with the original takedown request.

Figure 5:
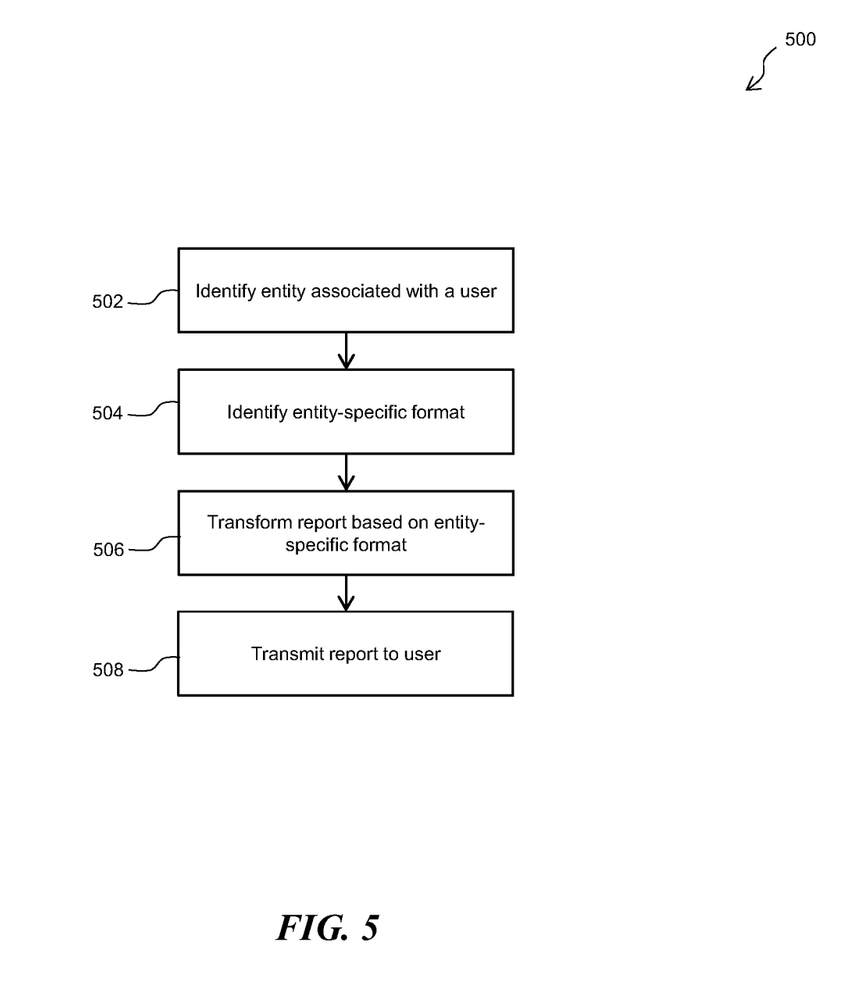
FIG. 5 is another example process for disrupting threats according to some embodiments of the present disclosure.

FIG. 5 is another example process 500 for disrupting threats according to some embodiments of the present disclosure. In some embodiments, process 500 can be a method of broadcasting directly to clients and/or users and can be performed by the reporting module 112 at block 214 of process 200. At block 502, the reporting module 112 identifies an entity associated with a user. For example, if a client endpoint 102 can access the security platform via login credentials, then the transformer 114 can determine (e.g., via the database 120) that said client endpoint 102 is associated with a particular client entity or organization. At block 504, based on the identified entity, the transformer 114 can identify an entity-specific format for receiving IOCs and reports. The format can be stored in the database 120 and indexed by entity. At block 506, the transformer 114 transforms the report (e.g., the IOCs) based on the entity-specific format. For example, this transformation can be such that the IOCs match a customer-requested JSON request body. At block 508, the reporting module 112 transmits the formatted report to the relevant client endpoint 102. This can include pushing the formatted report to their API endpoint.

Figure 6:
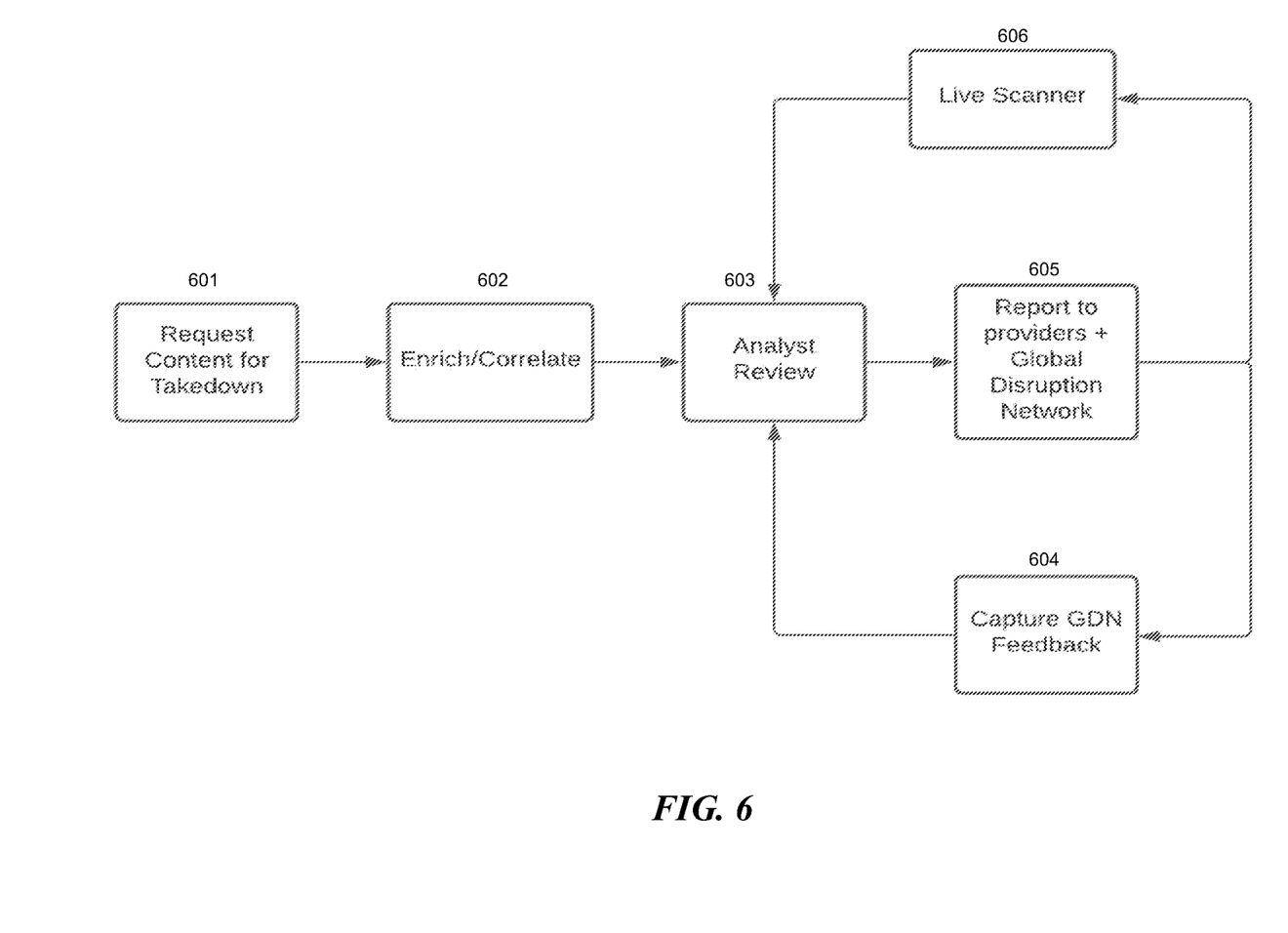
FIG. 6 is an example disruption workflow according to some embodiments of the present disclosure.

FIG. 6 is an example disruption workflow according to some embodiments of the present disclosure. Blocks 601, 602, 603, and 605 encapsulate process 200, where a takedown request is received (601), the request is enriched and correlated with IOCs (602), the report is reviewed and verified (603), and then it is all reported via the various disclose methods (604). As discussed in relation to FIG. 2, the live scanner 116 is configured to perform various scanning procedures to check on content requested to be taken down. As shown in FIG. 6, the scanning can happen as a feedback loop, where it is performed after the reporting, but the results of the scanning are reported to analysts at an analyst device 122. The scanning results can then be used to verify or deal with future requests for takedown. Additionally, at block 604, the feedback module 118 can capture feedback from the global disruption network 124 after reports have been broadcast and transmitted. The feedback module 118 is configured to measure the impact of distributing the reports (e.g., takedown requests, content, and IOCs) to the global disruption network 124 and can monitor the effectiveness of the system. The feedback module 118 is operatively connected to the global disruption network 124, receiving effectiveness information or "feedback", effectively forming a feedback loop.

Figure 7:
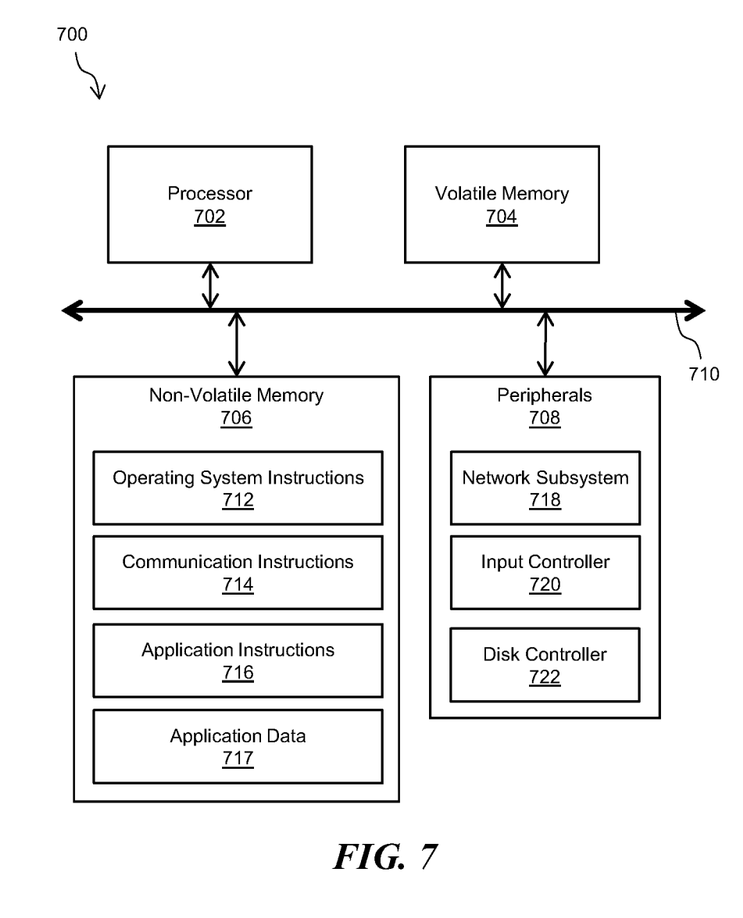
FIG. 7 is an example server device that can be used within the system of FIG. 1 according to an embodiment of the present disclosure.

FIG. 7 is a diagram of an example server device 700 that can be used within system 100 of FIG. 1. Server device 700 can implement various features and processes as described herein. Server device 700 can be implemented on any electronic device that runs software applications derived from complied instructions, including without limitation personal computers, servers, smart phones, media players, electronic tablets, game consoles, email devices, etc. In some implementations, server device 700 can include one or more processors 702, volatile memory 704, non-volatile memory 706, and one or more peripherals 708. These components can be interconnected by one or more computer buses 710.

Processor(s) 702 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 710 can be any known internal or external bus technology, including but not limited to ISA, EISA, PCI, PCI Express, USB, Serial ATA, or FireWire. Volatile memory 704 can include, for example, SDRAM. Processor 702 can receive instructions and data from a read-only memory or a random access memory or both. Essential elements of a computer can include a processor for executing instructions and one or more memories for storing instructions and data.

Non-volatile memory 706 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 706 can store various computer instructions including operating system instructions 712, communication instructions 714, application instructions 716, and application data 717. Operating system instructions 712 can include instructions for implementing an operating system (e.g., Mac OS®, Windows®, or Linux). The operating system can be multi-user, multiprocessing, multitasking, multithreading, real-time, and the like. Communication instructions 714 can include network communications instructions, for example, software for implementing communication protocols, such as TCP/IP, HTTP, Ethernet, telephony, etc. Application instructions 716 can include instructions for various applications. Application data 717 can include data corresponding to the applications.

Peripherals 708 can be included within server device 700 or operatively coupled to communicate with server device 700. Peripherals 708 can include, for example, network subsystem 718, input controller 720, and disk controller 722. Network subsystem 718 can include, for example, an Ethernet of WiFi adapter. Input controller 720 can be any known input device technology, including but not limited to a keyboard (including a virtual keyboard), mouse, track ball, and touch-sensitive pad or display. Disk controller 722 can include one or more mass storage devices for storing data files; such devices include magnetic disks, such as internal hard disks and removable disks; magneto-optical disks; and optical disks.

Figure 8:
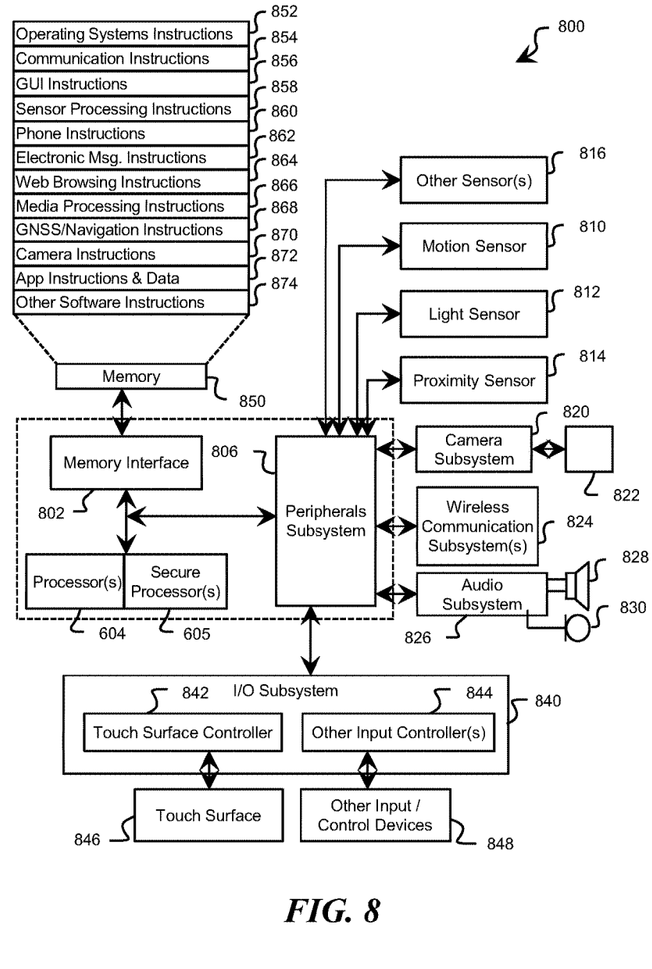
FIG. 8 is an example computing device that can be used within the system of FIG. 1 according to an embodiment of the present disclosure.

FIG. 8 is an example computing device that can be used within the system 100 of FIG. 1, according to an embodiment of the present disclosure. In some embodiments, device 800 can be a client device 202 and/or an analyst device 222. The illustrative user device 800 can include a memory interface 802, one or more data processors, image processors, central processing units 804, and/or secure processing units 805, and peripherals subsystem 806. Memory interface 802, one or more central processing units 804 and/or secure processing units 805, and/or peripherals subsystem 806 can be separate components or can be integrated in one or more integrated circuits. The various components in user device 800 can be coupled by one or more communication buses or signal lines.

Sensors, devices, and subsystems can be coupled to peripherals subsystem 806 to facilitate multiple functionalities. For example, motion sensor 810, light sensor 812, and proximity sensor 814 can be coupled to peripherals subsystem 806 to facilitate orientation, lighting, and proximity functions. Other sensors 816 can also be connected to peripherals subsystem 806, such as a global navigation satellite system (GNSS) (e.g., GPS receiver), a temperature sensor, a biometric sensor, magnetometer, or other sensing device, to facilitate related functionalities.

Camera subsystem 820 and optical sensor 822, e.g., a charged coupled device (CCD) or a complementary metal-oxide semiconductor (CMOS) optical sensor, can be utilized to facilitate camera functions, such as recording photographs and video clips. Camera subsystem 820 and optical sensor 822 can be used to collect images of a user to be used during authentication of a user, e.g., by performing facial recognition analysis.

Communication functions can be facilitated through one or more wired and/or wireless communication subsystems 824, which can include radio frequency receivers and transmitters and/or optical (e.g., infrared) receivers and transmitters. For example, the Bluetooth (e.g., Bluetooth low energy (BTLE)) and/or WiFi communications described herein can be handled by wireless communication subsystems 824. The specific design and implementation of communication subsystems 824 can depend on the communication network(s) over which the user device 800 is intended to operate. For example, user device 800 can include communication subsystems 824 designed to operate over a GSM network, a GPRS network, an EDGE network, a WiFi or WiMax network, and a Bluetooth™ network. For example, wireless communication subsystems 824 can include hosting protocols such that device 800 can be configured as a base station for other wireless devices and/or to provide a WiFi service.

Audio subsystem 826 can be coupled to speaker 828 and microphone 830 to facilitate voice-enabled functions, such as speaker recognition, voice replication, digital recording, and telephony functions. Audio subsystem 826 can be configured to facilitate processing voice commands, voice-printing, and voice authentication, for example.

I/O subsystem 840 can include a touch-surface controller 842 and/or other input controller(s) 844. Touch-surface controller 842 can be coupled to a touch-surface 846. Touch-surface 846 and touch-surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch-surface 846.

The other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of speaker 828 and/or microphone 830.

In some implementations, a pressing of the button for a first duration can disengage a lock of touch-surface 846; and a pressing of the button for a second duration that is longer than the first duration can turn power to user device 800 on or off. Pressing the button for a third duration can activate a voice control, or voice command, module that enables the user to speak commands into microphone 830 to cause the device to execute the spoken command. The user can customize a functionality of one or more of the buttons. Touch-surface 846 can, for example, also be used to implement virtual or soft buttons and/or a keyboard.

In some implementations, user device 800 can present recorded audio and/or video files, such as MP3, AAC, and MPEG files. In some implementations, user device 800 can include the functionality of an MP3 player, such as an iPod™. User device 800 can, therefore, include a 36-pin connector and/or 8-pin connector that is compatible with the iPod. Other input/output and control devices can also be used.

Memory interface 802 can be coupled to memory 850. Memory 850 can include high-speed random access memory and/or non-volatile memory, such as one or more magnetic disk storage devices, one or more optical storage devices, and/or flash memory (e.g., NAND, NOR). Memory 850 can store an operating system 852, such as Darwin, RTXC, LINUX, UNIX, OS X, Windows, or an embedded operating system such as VxWorks.

Operating system 852 can include instructions for handling basic system services and for performing hardware dependent tasks. In some implementations, operating system 852 can be a kernel (e.g., UNIX kernel). In some implementations, operating system 852 can include instructions for performing voice authentication.

Memory 850 can also store communication instructions 854 to facilitate communicating with one or more additional devices, one or more computers and/or one or more servers. Memory 850 can include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic messaging-related process and functions; web browsing instructions 864 to facilitate web browsing-related processes and functions; media processing instructions 866 to facilitate media processing-related functions and processes; GNSS/Navigation instructions 868 to facilitate GNSS and navigation-related processes and instructions; and/or camera instructions 870 to facilitate camera-related processes and functions.

Memory 850 can store application (or "app") instructions and data 872, such as instructions for the apps described above in the context of FIGS. 2-5 and for modules 108-118. Memory 850 can also store other software instructions 874 for various other software applications in place on device 800.

The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions can include, by way of example, both general and special purpose microprocessors, and the sole processor or one of multiple processors or cores, of any kind of computer. Generally, a processor can receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks.

The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method for disrupting a detected cyberthreat comprising:
   receiving a request, the request identifying suspected malicious content;
   identifying one or more indicators of compromise (IOCs) associated with the content;
   enriching the request with the IOCs;
   transmitting the request and the one or more IOCs to an analyst device;
   receiving a verification indication from the analyst device; and
   reporting the verified request and the one or more IOCs to a disruption network, wherein reporting the verified request and the one or more IOCs to the disruption network comprises providing access to one or more members of the disruption network to pull the request and the one or more IOCs via an application programming interface (API).

2. The method of claim 1, wherein the disruption network comprises a plurality of Internet providers and at least one of a domain registrar, a hosting platform, a domain name system (DNS) provider, an email security service, a content delivery network (CDN), or a deny list.

3. The method of claim 1, wherein identifying the one or more IOCs comprises identifying at least one of a social media account, a username of the social media account, an account ID of the social media account, a URL, a phishing kit, an author of the phishing kit, source code associated with the phishing kit, and one or more images.

4. The method of claim 1, wherein enriching the request comprises identifying at least one of a social network associated with the content, a geo-location associated with the content, a host associated with the content, a registrar associated with the content, an Internet Assigned Numbers Authority (IANA) ID associated with the content, an IP address associated with the content, an autonomous system number associated with the content, or a link shortener associated with the content.

5. The method of claim 1, wherein reporting the verified request and the one or more IOCs to the disruption network comprises:
   transmitting a first report to the disruption network, the first report comprising the verified request and the one or more IOCs;
   obtaining one or more additional IOCs in a subsequent 24-hour time period; and
   transmitting a second report to the disruption network, the second report comprising the verified request, the one or more IOCs, and the one or more additional IOCs.

6. The method of claim 1 further comprising performing a live scan of the content to determine whether the content is active.

7. The method of claim 6, wherein performing the live scan comprises at least one of:
   scanning a webpage associated with the content to identify a change of a removal of the content;
   scanning a webpage or a service for a service response; or monitoring an extensive provisional protocol (EPP) status of a domain associated with the content.

8. The method of claim 1 further comprising capturing feedback associated with the report to the disruption network, the capturing comprising at least one of:
determining, via a browser driver, if any of the one or more IOCs is indicated as being malicious;
determining, via querying a DNS server, if any of the one or more IOCs is blocked; or
determining, via an email security provider, if any of the one or more IOCs is indicated as being malicious.

9. A non-transitory computer-readable medium having instructions stored thereon for execution by a server to implement a method for disrupting a detected cyberthreat, the method comprising the steps of:
receiving a request, the request identifying suspected malicious content;
identifying one or more indicators of compromise (IOCs) associated with the content;
enriching the request with the IOCs;
transmitting the request and the one or more IOCs to an analyst device;
receiving a verification indication from the analyst device; and
reporting the verified request and the one or more IOCs to a third-party, wherein reporting the verified request and the one or more IOCs to the third-party comprises:
identifying an entity associated with the request:
identifying a format associated with the entity;
transforming the one or more IOCs based on the format; and
transmitting the transformed one or more IOCs and the request to the entity.

10. The non-transitory computer-readable medium of claim 9, wherein verifying the request comprises:
transmitting the request and the one or more IOCs to an analyst device; and
receiving a verification indication from the analyst device.

11. The non-transitory computer-readable medium of claim 9, wherein identifying the one or more IOCs comprises identifying at least one of a social media account, a username of the social media account, an account ID of the social media account, a URL, a phishing kit, an author of the phishing kit, source code associated with the phishing kit, and one or more images.

12. The non-transitory computer-readable medium of claim 9, wherein enriching the request comprises identifying at least one of a social network associated with the content, a geo-location associated with the content, a host associated with the content, a registrar associated with the content, an Internet Assigned Numbers Authority (IANA) ID associated with the content, an IP address associated with the content, an autonomous system number associated with the content, or a link shortener associated with the content.

13. The non-transitory computer-readable medium of claim 9, wherein the method further comprises performing a live scan of the content to determine whether the content is active.

14. The non-transitory computer-readable medium of claim 9, wherein performing the live scan comprises at least one of:
scanning a webpage associated with the content to identify a change of a removal of the content;
scanning a webpage or a service for a service response; or
monitoring an extensive provisional protocol (EPP) status of a domain associated with the content.

15. The non-transitory computer-readable medium of claim 9, wherein the method further comprises capturing feedback associated with the reporting, the capturing comprising at least one of:
determining, via a browser driver, if any of the one or more IOCs is indicated as being malicious;
determining, via querying a DNS server, if any of the one or more IOCs is blocked; or
determining, via an email security provider, if any of the one or more IOCs is indicated as being malicious.

16. A system for disrupting a detected cyberthreat, the system comprising a server, the server comprising a processor and a non-transitory computer-readable medium storing instructions that, when executed by the processor, cause the processor to perform a method operable to:
receive a request, the request identifying suspected malicious content;
identify one or more indicators of compromise (IOCs) associated with the content;
enrich the request with the IOCs;
verify the request; and
report the verified request and the one or more IOCs to a third-party, wherein reporting the verified request and the one or more IOCs to the third-party comprises:
transmitting a first report to the third-party, the first report comprising the verified request and the one or more IOCs;
obtaining one or more additional IOCs in a subsequent 24-hour time period; and
transmitting a second report to the third-party, the second report comprising the verified request, the one or more IOCs, and the one or more additional IOCs.

17. The system of claim 16 wherein reporting the verified request and the one or more IOCs to the third-party comprises:
identifying an entity associated with the request;
identifying a format associated with the entity;
transforming the one or more IOCs based on the format; and
transmitting the transformed one or more IOCs and the request to the entity.

18. The system of claim 16 wherein the server is further configured to capture feedback associated with the reporting, the capturing comprising at least one of:
determining, via a browser driver, if any of the one or more IOCs is indicated as being malicious;
determining, via querying a DNS server, if any of the one or more IOCs is blocked; or
determining, via an email security provider, if any of the one or more IOCs is indicated as being malicious.

* * * * *